(12) United States Patent
Lewis

(10) Patent No.: US 10,680,732 B2
(45) Date of Patent: Jun. 9, 2020

(54) DISTRIBUTED ANTENNA SYSTEMS FOR MULTI-OPERATOR NETWORKS

(71) Applicant: Maven Wireless Sweden AB, Kista (SE)

(72) Inventor: Michael Lewis, Märsta (SE)

(73) Assignee: Maven Wireless Sweden AB, Kista (SE)

(*) Notice: Subject to any disclaimer, the term of this patent is extended or adjusted under 35 U.S.C. 154(b) by 0 days.

(21) Appl. No.: 16/487,199

(22) PCT Filed: Feb. 20, 2018

(86) PCT No.: PCT/EP2018/054074
§ 371 (c)(1),
(2) Date: Aug. 20, 2019

(87) PCT Pub. No.: WO2018/153828
PCT Pub. Date: Aug. 30, 2018

(65) Prior Publication Data
US 2019/0386761 A1 Dec. 19, 2019

(30) Foreign Application Priority Data
Feb. 21, 2017 (SE) ...................................... 1750176

(51) Int. Cl.
*H04J 3/06* (2006.01)
*H04L 25/05* (2006.01)
(Continued)

(52) U.S. Cl.
CPC ............ *H04J 3/0638* (2013.01); *H04L 25/05* (2013.01); *H04L 67/1095* (2013.01); *H04W 88/06* (2013.01)

(58) Field of Classification Search
None
See application file for complete search history.

(56) References Cited

U.S. PATENT DOCUMENTS 5,548,679 A * 8/1996 Kiyota .................... H02P 23/22
318/600
2004/0102157 A1 5/2004 Lewis
(Continued)

FOREIGN PATENT DOCUMENTS

EP 3054743 A1 8/2016
WO 2004017544 A2 2/2004
(Continued)

OTHER PUBLICATIONS

International Preliminary Report on Patentability for International Application No. PCT/EP2018/054074, dated May 27, 2019—16 pages.
(Continued)

*Primary Examiner* — Anh Ngoc M Nguyen
(74) *Attorney, Agent, or Firm* — RatnerPrestia

(57) ABSTRACT

Mechanisms for controlling sample rate and frequency shift of a digital signal in a multi-operator network. A method is performed by a network node. The method includes obtaining a frequency difference and a phase difference between two clock domains. One of the clock domains is associated with a radio access network of a network operator of the multi-operator network and the other of the clock domains is associated with a distributed antenna system in the multi-operator network. The method includes controlling sample rate conversion of the digital signal between the two clock domains using the phase difference. The digital signal is communicated between the radio access network and the distributed antenna system. The method includes controlling a frequency shift of the digital signal using the frequency difference.

13 Claims, 6 Drawing Sheets

(51) Int. Cl.
*H04L 29/08* (2006.01)
*H04W 88/06* (2009.01)

(56) References Cited

U.S. PATENT DOCUMENTS

| | | |
|---|---|---|
| 2010/0020685 A1 | 1/2010 | Short et al. |
| 2010/0278530 A1 | 11/2010 | Kummetz et al. |
| 2011/0142447 A1 | 6/2011 | Boyd et al. |
| 2011/0224996 A1* | 9/2011 | Wang ............ H04L 7/0029 |
| | | 704/503 |
| 2011/0243291 A1 | 10/2011 | McAllister et al. |
| 2013/0128933 A1* | 5/2013 | Hsu ............ H04L 12/6418 |
| | | 375/219 |
| 2015/0098372 A1 | 4/2015 | Zavadsky et al. |
| 2016/0127101 A1 | 5/2016 | Hanson et al. |
| 2017/0085405 A1 | 3/2017 | Xu et al. |
| 2018/0124729 A1 | 5/2018 | Hanson |

FOREIGN PATENT DOCUMENTS

| | | |
|---|---|---|
| WO | 2009123523 A1 | 10/2009 |
| WO | 2015054165 A1 | 4/2015 |
| WO | 2016209290 A1 | 12/2016 |

OTHER PUBLICATIONS

International Search Report and Written Opinion for International Application No. PCT/EP2018/054074, dated May 9, 2018—11 pages.
Swedish Office Action for Swedish Application No. 1750176-8, dated Jul. 19, 2017—9 pages.
Non Final Office Action for U.S. Appl. No. 16/488,075, dated Feb. 20, 2020, 20 pages.

* cited by examiner

DISTRIBUTED ANTENNA SYSTEMS FOR MULTI-OPERATOR NETWORKS

This application is a U.S. National Phase application of PCT International Application No. PCT/EP2018/054074, filed Feb. 20, 2018, which claims the benefit of Swedish Application SE 1750176-8, filed Feb. 21, 2017, both of which are incorporated by reference herein.

TECHNICAL FIELD

Embodiments presented herein relate to a method, a network node, a computer program, and a computer program product for controlling sample rate and frequency shift of a digital signal in a multi-operator network.

BACKGROUND

A distributed antenna system (DAS) could be used to provide radio network coverage in an enclosed area that cannot receive signals from a general mobile radio network. Non-limiting examples where DAS advantageously could be deployed are tunnels in a metro system, or a building complex.

A typical digital DAS 110 is shown in the communications network 100a of FIG. 1. Head-end equipment, hereinafter referred to as master head units (MHUs) 140 are configured to receive downlink signals from radio base stations (RBSs) in a radio access network (RAN) 150, and convert the downlink signals for transport on optical fibres in a transport network 120 to remote nodes, hereinafter referred to as remote head units (RHUs) 130, located in the coverage area of the RBSs. The RBSs are typically operated by one or more network operators. The RHUs are configured to convert the optical signals into radio signals which can be broadcast on antennas driven by the RHUs for transport to/from wireless communication devices such as smart phones and tablets. Each RHU in turn is configured to receive uplink signals from its connected antenna(s) and to convert the uplink signals for transmission over the optical fibres back to the MHUs and onward to the RBSs.

In the example of FIG. 1 the MHUs and the RBSs communicate over a radio interface. The downlink signals generated by baseband units (BBUs) 170 of the RBSs are therefore converted to radio signals by radio units (RUs) 150 in the RBSs before transmission to the MHUs. Likewise, the uplink signals are converted by the MHUs to radio signals between being transmitted to the RUs of the RBSs. The BBUs are configured to perform baseband coding and modulation in the downlink direction and demodulation and decoding in the uplink direction. Each RU is configured to convert the modulated digital baseband signals into radio signals and vice versa, using the frequency reference it has derived from the signal from its BBU.

The MHUs as well as the RHUs each have a digital interface to the DAS and in the DAS the radio signals are thus transported in the form of digital samples, usually over fibre optic connections, though not always. Digital data transport allows for flexible routing and distribution of radio signals with a much finer degree of control over which signals go to which remote nodes.

Given that the DAS is based on a digital transport, and the interface from the BBU to the RU is digital, a connection could be made directly from the BBU to an MHU in the DAS over which the digital signals can be transported directly between the BBU and the RHUs without a need for the intermediate conversion to and from analogue RF signals.

In view of the above, the DAS could thus be regarded as acting as an extension of the RBSs, which means that the signals transmitted by the RHUs must meet the same, or similar, requirements as apply to signals transmitted directly by the RBSs. One such requirement is that the frequency error (i.e., the difference between the actual and ideal transmitted channel frequency) must be small. For example, the Long Term Evolution (LTE) technical specification 3GPP TS 25.104 mandates a frequency error of between 50 and 250 parts per billion (with RBSs serving wide areas having the toughest requirement). This specification also mandates the same frequency source to be used to derive both the radio frequency and the modulation rate, so that the signal processing in the wireless communication devices only needs to compensate for a single frequency offset parameter.

Where there are multiple overlapping cells served by RBSs it is desirable that these cells use the same timing reference so that the transmit frequencies of all RBSs are the same, allowing for advanced interference management and coordinate multi-point transmissions.

The issue of frequency error becomes even more apparent in multi-operator networks (i.e., a network with multiple network operators) where RBSs from several, or at least two, different network operators are operatively connected to the same DAS. With a single network operator DAS, the DAS can be synchronized to the frequency reference of that network operator, samples can be transferred synchronously between the BBUs and the DAS, and the RHUs can generate radio signals with frequencies corresponding to the frequencies that would be generated directly by an operator RU. In a multi-operator DAS, each network operator has their own frequency reference and there is no one common frequency reference to which the DAS can be synchronized.

Hence, there is a need for improved operation of multi-operator networks where RANs of different network operators are operatively connected to the same DAS especially where the RANs are operatively connected to the DAS over digital interfaces.

SUMMARY

An object of embodiments herein is to solve, or at least mitigate, this issue by providing efficient handling of frequency errors in multi-operator networks.

According to a first aspect there is presented a method for controlling sample rate and frequency shift of a digital signal in a multi-operator network. The method is performed by a network node. The method comprises obtaining a frequency difference and a phase difference between two clock domains. One of the clock domains is associated with a radio access network of a network operator of the multi-operator network and the other of the clock domains is associated with a distributed antenna system in the multi-operator network. The method comprises controlling sample rate conversion of the digital signal between the two clock domains using the phase difference. The digital signal is communicated between the radio access network and the distributed antenna system. The method comprises controlling a frequency shift of the digital signal using the frequency difference.

Advantageously this method enables transport of frequency and sample rate corrected digital signals in the multi-operator network.

Advantageously this method allows for each network operator to have their own digital interfaces to the DAS whilst maintaining independent frequency references per network operator.

According to a second aspect there is presented a network node for controlling sample rate and frequency shift of a digital signal in a multi-operator network. The network node comprises processing circuitry. The processing circuitry is configured to cause the network node to obtain a frequency difference and a phase difference between two clock domains. One of the clock domains is associated with a radio access network of a network operator of the multi-operator network and the other of the clock domains is associated with a distributed antenna system in the multi-operator network. The processing circuitry is configured to cause the network node to control sample rate conversion of the digital signal between the two clock domains using the phase difference. The digital signal is communicated between the radio access network and the distributed antenna system. The processing circuitry is configured to cause the network node to control a frequency shift of the digital signal using the frequency difference.

According to a third aspect there is presented a network node for controlling sample rate and frequency shift of a digital signal in a multi-operator network. The network node comprises processing circuitry and a storage medium. The storage medium stores instructions that, when executed by the processing circuitry, cause the network node to perform operations, or steps. The operations, or steps, cause the network node to obtain a frequency difference and a phase difference between two clock domains. One of the clock domains is associated with a radio access network of a network operator of the multi-operator network and the other of the clock domains is associated with a distributed antenna system in the multi-operator network. The operations, or steps, cause the network node to control sample rate conversion of the digital signal between the two clock domains using the phase difference. The digital signal is communicated between the radio access network and the distributed antenna system. The operations, or steps, cause the network node to control a frequency shift of the digital signal using the frequency difference.

According to a fourth aspect there is presented a network node for controlling sample rate and frequency shift of a digital signal in a multi-operator network. The network node comprises an obtain module configured to obtain a frequency difference and a phase difference between two clock domains. One of the clock domains is associated with a radio access network of a network operator of the multi-operator network and the other of the clock domains is associated with a distributed antenna system in the multi-operator network. The network node comprises a control module configured to control sample rate conversion of the digital signal between the two clock domains using the phase difference. The digital signal is communicated between the radio access network and the distributed antenna system. The network node comprises a control module configured to control a frequency shift of the digital signal using the frequency difference.

According to a fifth aspect there is presented a computer program for controlling sample rate and frequency shift of a digital signal in a multi-operator network, the computer program comprising computer program code which, when run on a network node, causes the network node to perform a method according to the first aspect.

According to a sixth aspect there is presented a computer program product comprising a computer program according to the fifth aspect and a computer readable storage medium on which the computer program is stored. The computer readable storage medium could be a non-transitory computer readable storage medium.

It is to be noted that any feature of the first, second, third, fourth, fifth and sixth aspects may be applied to any other aspect, wherever appropriate. Likewise, any advantage of the first aspect may equally apply to the second, third, fourth, fifth and/or sixth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

In general terms, manufacturers of the RBSs design the equipment in the RAN with an aim for the equipment to be synchronized to a common timing reference. The timing reference is transported through the RAN via the symbol clock of digital interconnections. A clock recovery mechanism at the receive side of the digital link extracts the symbol clock, which feeds a jitter cleaner to regenerate a clean local clock signal synchronized to a master timing reference. Deriving local clocks from a common reference frequency also has the beneficial consequence that there is no need to deal with mismatches between the rate with which samples are generated and consumed at different points in the RAN.

The timing references are often derived from transmissions a global positioning system (GPS), and there are mechanisms for hold-over and fallback in the event that the reference source is temporarily lost. Each network operator typically has their own infrastructure for this purpose, and since there could be several options for how these references could be created it is not guaranteed that they are identical at any particular time even though different network operators may all derive their reference clocks from GPS transmissions.

With reference again to FIG. 1, there is illustrated an example with two network operators, each having its own RAN, where each of the RANs is symbolized by one of the RBSs. For simplicity only one RBS connection to the DAS is shown per network operator, although in practice there will typically be multiple RBSs per network operator connected over a number of MHUs, with each MHU enabled to terminate multiple connections. Thus, as the skilled person understands, each network operator may have a plurality of RBSs in its RAN.

A frequency reference is shown as connected directly to the BBU, but in practice it is likely to come from some source deeper within the operator network, as disclosed above.

Figure 1:
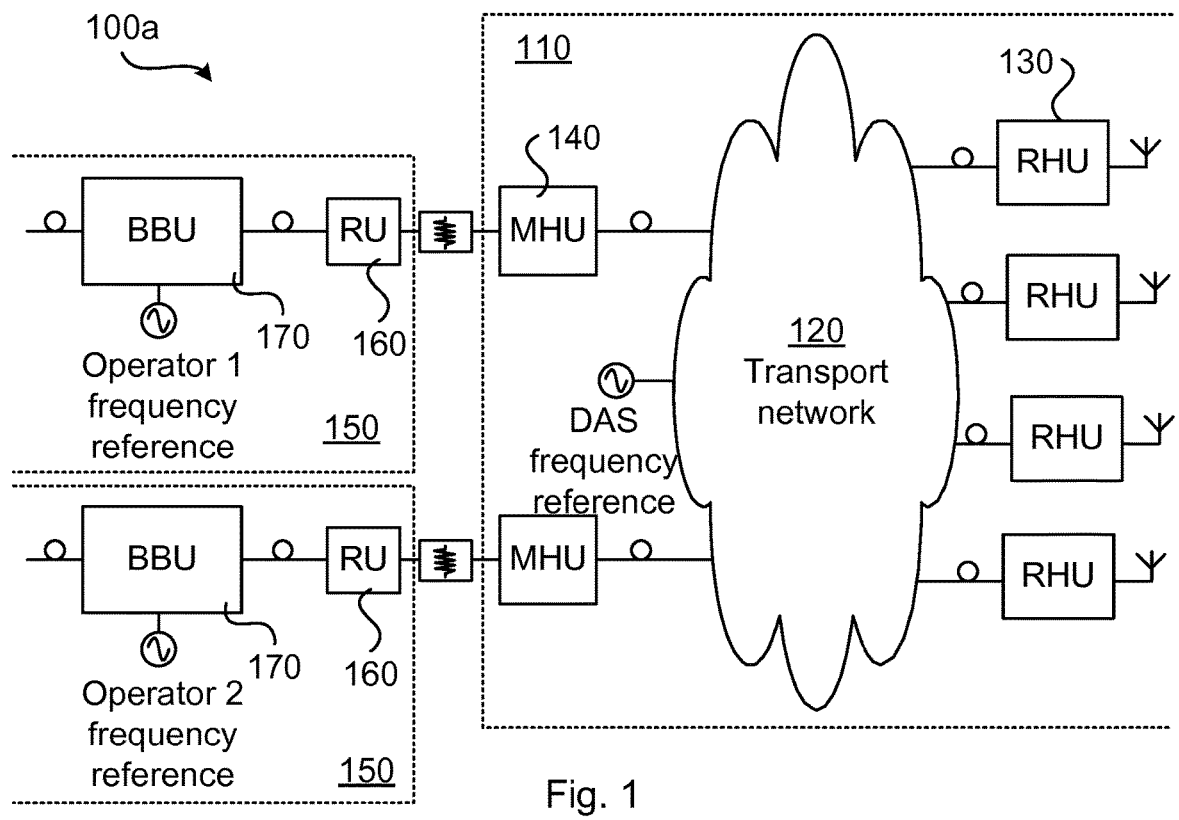
FIGS. 1, 2 and 3 are schematic diagram illustrating communications networks according to embodiments.

As in FIG. 1, the majority of existing digital DASs use analogue radio interfaces to the RAN, as illustrated by the RUs. Radio signals transmitted from the RUs are attenuated to a suitably low power level so that they can be processed in the MHUs. In each MHU the received signal from the corresponding RU is mixed down to an intermediate frequency by a down-converter so that it can be converted into digital form by an analogue to digital converter in the MHU. The thus digital signal is then processed for transmission through the DAS transport network (for example, with digital filtering to extract only the wanted base station transmissions).

After transmission through the DAS transport network, the digital signal arrives at the chosen RHU and is converted back into an analogue signal. The analogue signal is then sent to an up-converter to mix it back to the original radio frequency. In the uplink direction the reverse is done; the received signal at each RHU is down-converted, digitized, filtered and sent back to the MHU where it is converted back to analogue form and up-converted back to the original frequency.

The digital DAS also requires a frequency reference. This frequency reference could be taken from an external source, be generated by a dedicated unit within the DAS, or be included within one of the MHU or RHU. This frequency reference need not be as accurate as the frequency reference of the RBS. Since the down-converter and up-converter reference frequencies at each unit (such as MHU or RHU) are derived relative to the same frequency reference, any error introduced in the down-conversion will be corrected in the up-conversion. The only side-effect is that the down-converted signal will be slightly offset in frequency from the ideal intermediate frequency. But the residual error is typically so small that it has no significant effect on the digitizing, filtering and transport through the DAS. The DAS otherwise appears as a transparent "pipe" through which signals from the RBSs are transported. The fact that the internal sample rate within the DAS digital transport might not be the same as the RBSs sample rate is irrelevant since the signal of interest is nonetheless contained entirely within the passband transported by the DAS.

However, the need to convert from digital form at the BBU, to radio frequency via an RU, which will typically generate an output signal with a power level at tens of watts, and then back to digital form again, adds complexity and cost and has an impact on performance. The RU consumes significant power, and this waste heat from the RU and the radio frequency power dissipated in, for example, attenuators, and possible other equipment, must be removed. This adds to the electrical and cooling costs for the head-end equipment room. Further, the process of converting to and from radio frequency analogue signals inevitably introduces noise and distortion at each stage, which could be minimized through the use of high-grade and expensive components, such as attenuators rated for low passive intermodulation. These disadvantages make it attractive from a system perspective to bypass the conversion to and from radio frequency analogue signals (particularly when viewed from the perspective of the network operators who have to pay for the equipment and the operating costs).

Existing equipment is designed to provide a digital interface to a single RAN, or RBS, leading to a system where in practice only a single network operator can have a digital connection to the DAS; other network operators could in principle still interface with the same DAS via radio frequency interfaces.

Figure 2:
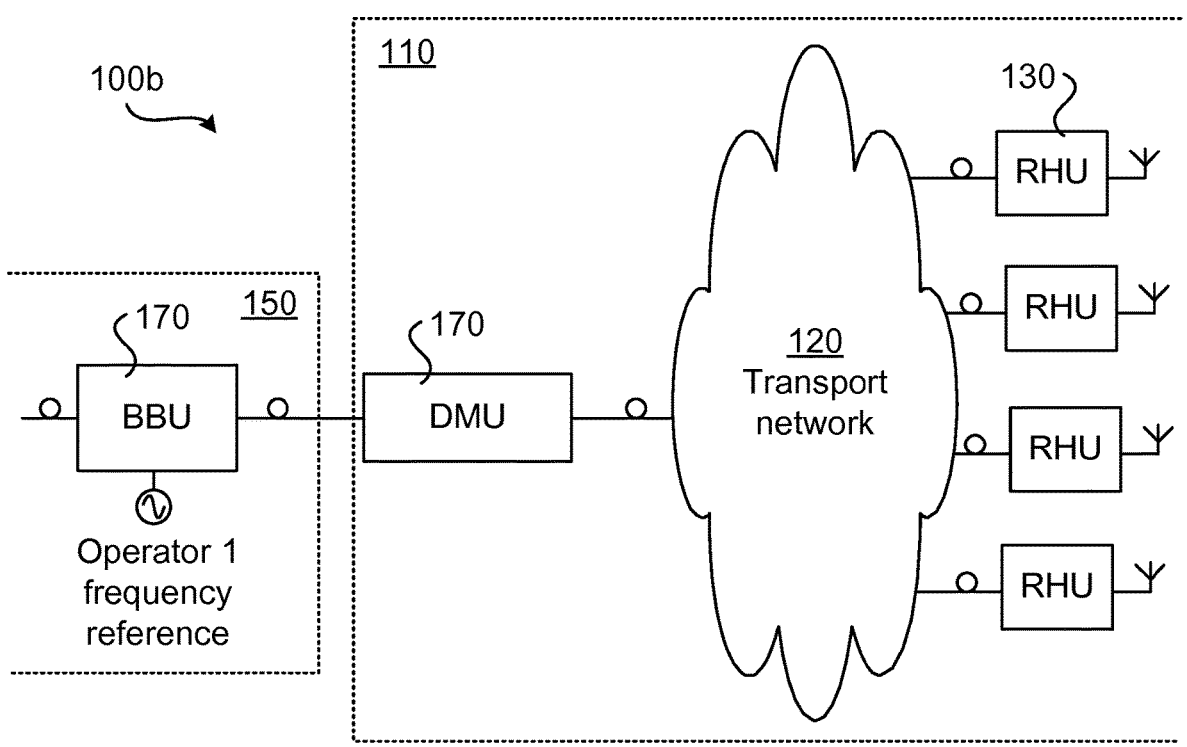

An example of such a single digital interface is illustrated in the communications network 100b of FIG. 2. The communications network 100b is similar to the communications network 100a of FIG. 1 but with the difference that there is only one network operator and that the BBU interfaces directly to a digital master unit (DMU) 170. The DMU thus replaces the above MHU. Except from having digital interfaces, thus removing any need for up and down conversion, the DMU performs the same functionality as the MHU.

When only a single network operator needs to make a digital interface to the system, the DAS frequency reference can be derived from the operator frequency reference as extracted in an MHU receiving the digital signal from a BBU. From there the network operator reference frequency can be distributed throughout the system and be used to generate an accurate frequency output at each of the MHUs and RHUs.

Since the DAS is synchronized to the same frequency reference as the operator RAN, the sample rate of the signals at the BBU and in the DAS transport are also synchronized. This means that the rate at which samples of the digital signal are produced and consumed are equal in both directions.

While this provides an acceptable solution for a DAS used for digital feed for a single network operator, the DAS can only be synchronized to a single frequency reference.

Any additional network operator must interface the DAS via radio frequency signals and the DAS owner must deal with the resulting power consumption and heat dissipation.

The embodiments disclosed herein therefore relate to mechanisms for controlling sample rate and frequency shift of a digital signal in a multi-operator network 100c. In order to obtain such mechanisms there is provided a network node 200, a method performed by the network node 200, a computer program product comprising code, for example in the form of a computer program, that when run on a network node 200, causes the network node 200 to perform the method.

Figure 3:
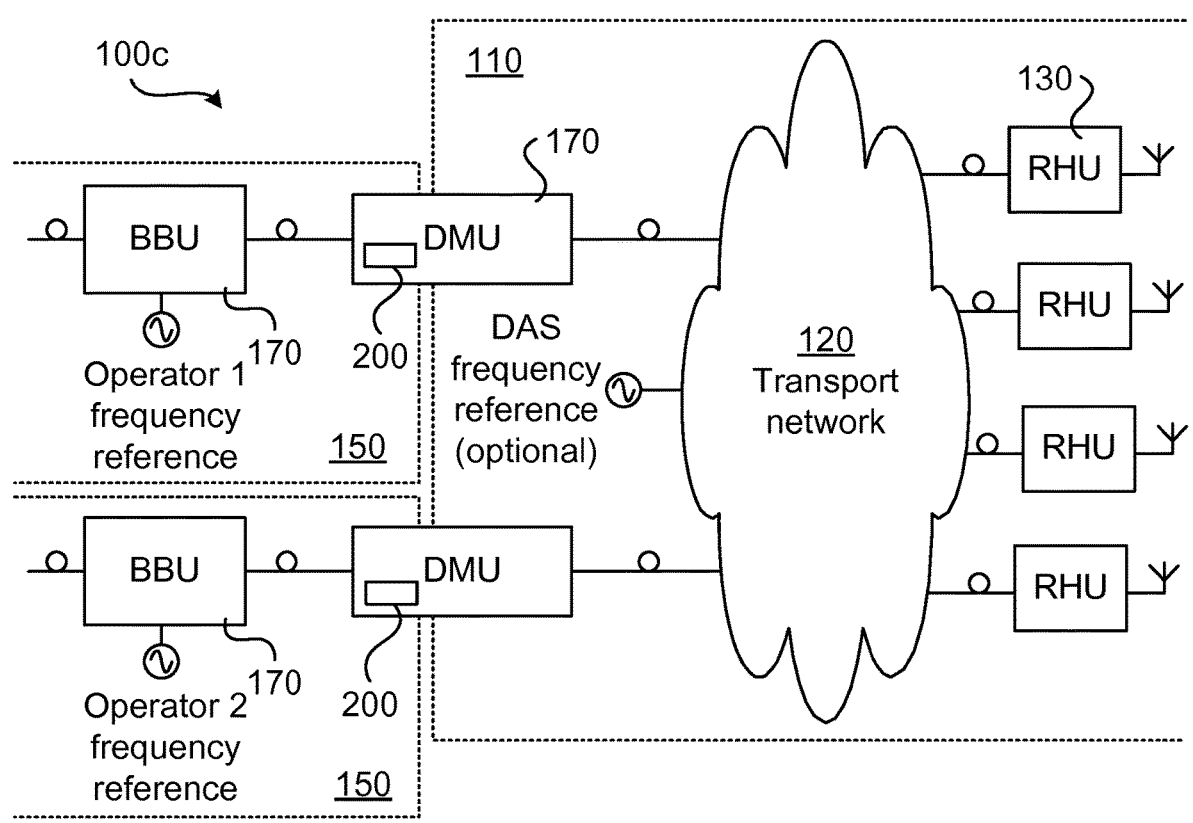

FIG. 3 schematically illustrates an example of a communications network 100c where the herein disclosed embodiments apply. The communications network 100c is similar to the communications network 100b of FIG. 2 but with the difference that the communications network 100c allows for each network operator to have their own digital interfaces to the DAS whilst maintaining independent frequency references per network operator. The communications network 100c is therefore hereinafter denoted a multi-operator network 100c. The multi-operator network 100c comprises network nodes 200. The network node 200 is operatively connected so as to digitally interface the DAS and at least one of the RANs. Further in this respect the network node 200 could be co-located with, part of, or implemented in, the DMUs. Further aspects of the network nodes 200 will be disclosed below.

In some aspects the clock domain of the DAS is based on its own internal frequency reference. In other aspects the clock domain of the DAS is based on a frequency reference of one of the network operators of the multi-operator network 100c. The frequency reference could then be recovered from the bit rate in the digital signal as received from an RBS of one of the network operators. Further, the frequency reference could be fed to the DAS as a separate clock signal. The DAS may thus have its own internal frequency reference or might derive its frequency reference from one of the operator frequency references by synchronizing to the signal from one of the RANs. This leads to a number of separate clock domains in the multi-operator network 100c; one for the DAS and one for each independent network operator reference frequency.

As will be further disclosed below, each DMU implements a bridge between these clock domains, and measures the frequency offset between the DAS clock domain and the operator clock domain with a sufficient accuracy that a frequency compensation can be applied for each digital signal of each network operator such that radio frequency signals for each network operator can be recreated with substantially the same frequency that they would have had if directly synchronized to the operator reference frequency.

Figure 4:
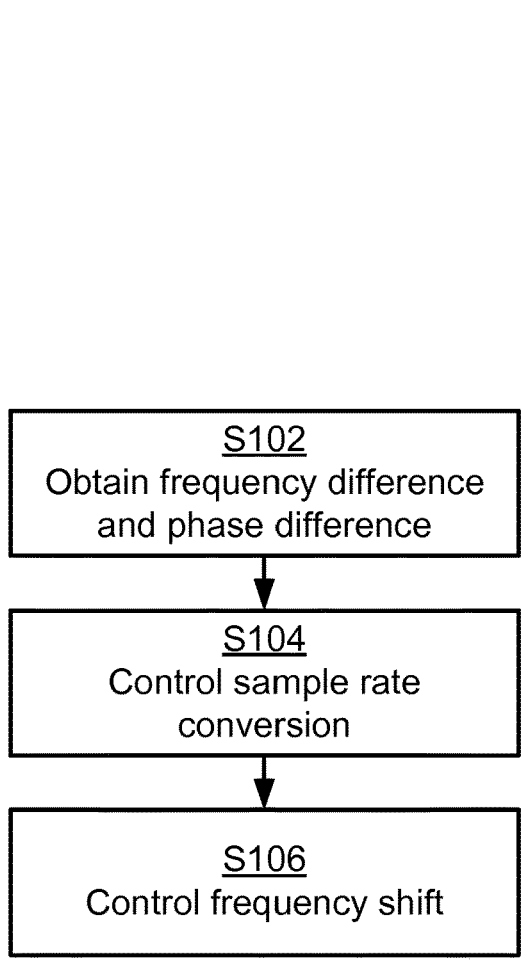
FIGS. 4 and 5 are flowcharts of methods according to embodiments.
Figure 5:
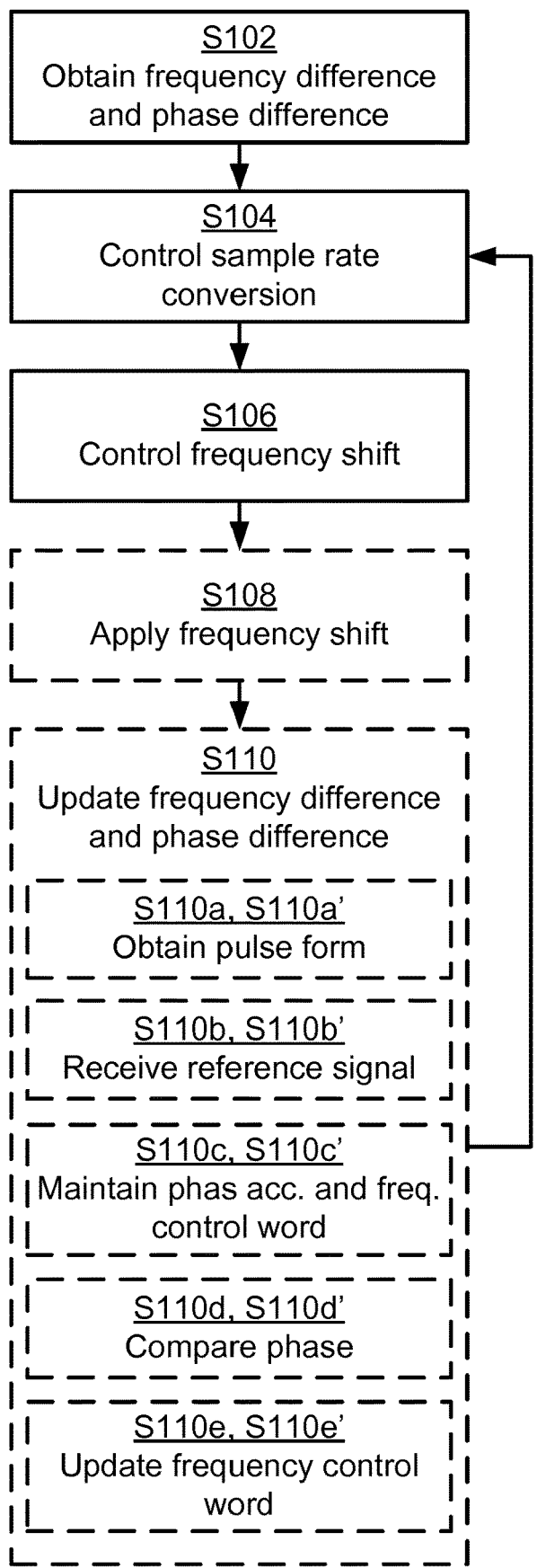

FIGS. 4 and 5 are flowcharts illustrating embodiments of methods for controlling sample rate and frequency shift of a digital signal in a multi-operator network 100c. The methods are performed by the network node 200. The methods are advantageously provided as computer programs 1120.

Reference is now made to FIG. 4 illustrating a method for controlling sample rate and frequency shift of a digital signal in a multi-operator network 100c as performed by the network node 200 according to an embodiment.

First a frequency difference and a phase difference between the clock domain of the RAN and of the clock domain of the DAS is obtained. Hence, the network node 200 is configured to perform step S102:

S102: The network node 200 obtains a frequency difference and a phase difference between two clock domains. One of the clock domains is associated with a RAN of a network operator of the multi-operator network 100c and the other of the clock domains is associated with the DAS in the multi-operator network 100c.

The network node 200 uses the phase difference to control sample rate conversion. Hence, the network node 200 is configured to perform step S104:

S104: The network node 200 controls sample rate conversion of the digital signal between the two clock domains using the phase difference. The digital signal is communicated between the RAN and the DAS.

The network node 200 uses the frequency difference to control frequency shift. Hence, the network node 200 is configured to perform step S106:

S106: The network node 200 controls a frequency shift of the digital signal using the frequency difference.

The frequency shift is thus determined using the frequency error so as to correct for the frequency error and thereby enable generation of a radio frequency in the clock domain associated with the DAS as would have been derived in the clock domain associated with the RAN (in absence of any frequency difference).

In other words, frequency compensation can thereby be applied for digital signals of each network operator in the multi-operator network 100c such that radio frequency signals for each network operator can be recreated with substantially the same frequency that they would have if directly synchronized to the operator reference frequency.

Reference is now made to FIG. 5 illustrating methods for controlling sample rate and frequency shift of a digital signal in a multi-operator network 100c as performed by the network node 200 according to further embodiments. It is assumed that steps S102, S104, S106 are performed as described above with reference to FIG. 4 and a thus repeated description thereof is therefore omitted.

Generally, the frequency difference defines a difference in reference frequencies (between the two clock domains). This difference in reference frequencies may either be corrected for, or compensated for, by the network node 200 or by another entity, device, node, or function, in the multi-operator network 100c. Hence, according to an embodiment the network node 200 is configured to perform step S108:

S108: The network node 200 applies the frequency shift to the digital signal so as to compensate the digital signal for a radio frequency difference caused by the difference in reference frequencies.

Figure 6:
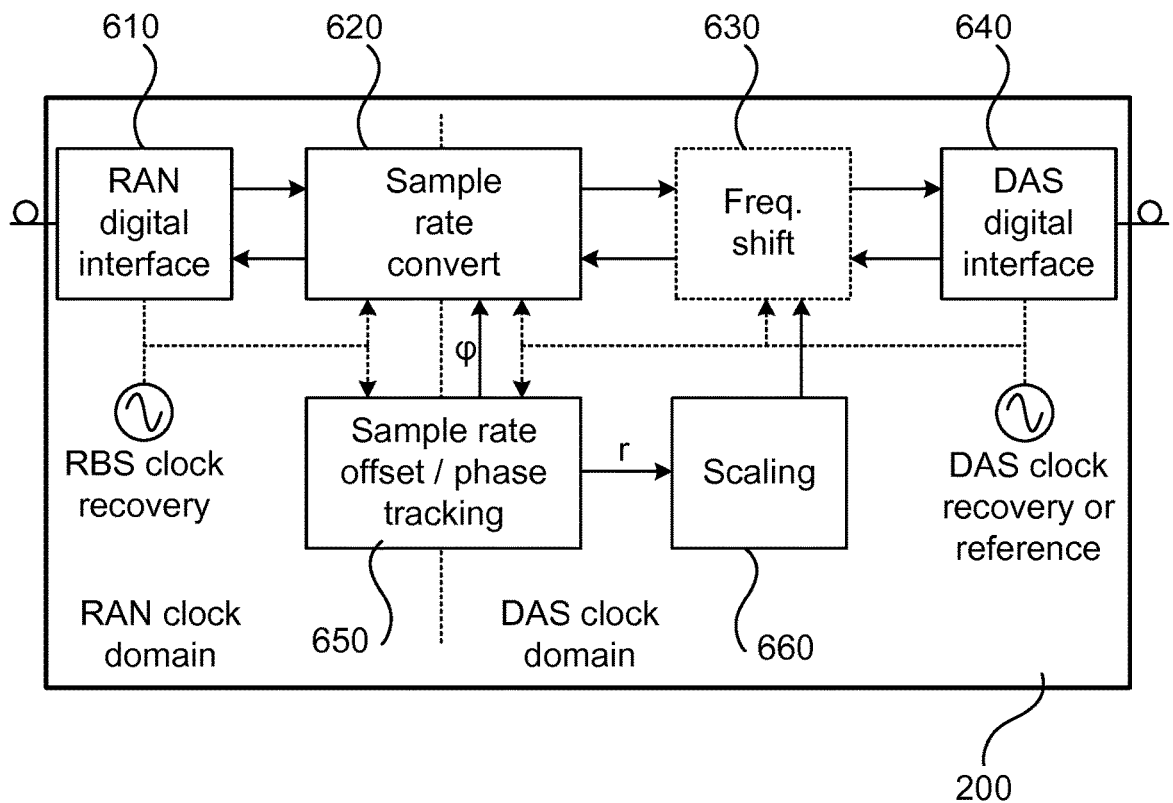
FIG. 6 is a block diagram of a network node according to an embodiment.

Intermediate reference is now made to FIG. 6. FIG. 6 is a block diagram illustrating processing within the network node 200. As mentioned above, the network node 200 could be co-located with, part of, or implemented in, a DMU. The network node 200 thus comprises a digital interface 610 to the RAN and a digital interface 640 to the DAS.

The network node 200 has access to two frequency references internally; one synchronized to the digital signal from the BBU (i.e., the clock domain associated with the RAN) and the other synchronized to the DAS reference frequency (i.e., the clock domain associated with the DAS). Depending on how the DAS is configured, the network node 200 itself (or its associated DMU) may also act as the DAS reference.

In downlink, the samples are received via the DMU from the RAN and consumed by the DAS at almost but not quite the same rate; in uplink the situation is the reversed. That means that over time the sampling instants will drift out of alignment and over millions of samples then the number of samples received and consumed will differ (typical sample rates will be 10 s of MHz which means that a 0.1 ppm error will correspond to a whole sample difference every second, a simple DAS reference source might have a variation of as much of 10 ppm or more). Over the time this difference causes sample buffers to under-run or over-run if not compensated for. Such compensation can be implemented using a fractional delay sample rate conversion function 620 (that thus could be configured to perform above step S104) with an input phase estimate φ determined by a sample rate offset/phase tracking function 650. The fractional delay sample rate conversion function 620 could be implemented using a polyphase filter, a sin c filter or a Farrow filter. This allows the relative shift of the sample instants in the RAN and DAS clock domains to be compensated for by adjusting the delay of the incoming digital signal such that it aligns with each outgoing sample instant. At the points where the fractional delay crosses a whole sample boundary, a sample is discarded or inserted.

In some aspects, in order to make use of the fractional delay filter to bridge the two clock domains, the sampling phase difference between the two clock domains is tracked. In general terms, the sampling phase difference can be expressed as the integral of the frequency difference accumulated over time. This tracking is performed by the sample rate offset/phase tracking function 650 (that thus could be configured to perform above step S102) in FIG. 6. The sample rate offset estimate is also an estimate of the frequency offset, which is corrected for by a frequency shift function 630 (that thus could be configured to perform above step S106) by frequency shifting the transported signal according to a value r representing the frequency shift determined by the sample rate offset/phase tracking function 650 and converted to radio frequency by a scaling function 660 producing a value $k \cdot (1-r) \cdot F_{ref}$. The needed frequency shift is proportional to the frequency error multiplied by the absolute radio frequency of the channel. That is, according to an embodiment the frequency shift is proportional to a frequency error between a reference frequency of the clock domain associated with the RAN and a reference frequency of the clock domain associated with the DAS. This frequency shift can be implemented by a quadrature digital mixer with a numerically controlled oscillator (NCO) generating a complex exponential phasor x (as so-called digital mixer) rotating at the desired frequency according to:

$$x = \cos(wk) + i \cdot \sin(wk),$$

where k is the sample index and w is the estimated frequency correction offset (in radians per second). When a complex baseband signal is multiplied by x its center frequency is shifted by the frequency of the complex phasor x. The NCO is typically implemented as a phase accumulator with a suitable number of fractional bits precision and the frequency as a phase increment per sample, while the cosine and sine functions can be implemented with a look-up table or for example using the CORDIC algorithm (where CORDIC is short for COordinate Rotation DIgital Computer).

The frequency shift function has a dashed outlined to indicate that while it can be placed at the location shown, it could also be placed anywhere else in the digital signal path (for example, somewhere in the clock domain associated with the RAN or even at each RHU) while retaining the same functionality.

An estimate of the frequency offset could be readily obtained by running counters in the two clock domains. Particularly, according to an embodiment the frequency difference is obtained from a difference in update rate between a counter in the clock domain of the RAN and a counter in the clock domain of the DAS. Further, according to this embodiment, the phase difference is obtained from an absolute value difference between the counter in the clock domain of the RAN and the counter in the clock domain. As an example, an enable signal is generated over a known number of cycles of a counter in one clock domain, and the rising and falling edges of the enable signal is used to latch start and end values of a corresponding counter in the other clock domain. The difference in the number of cycles counted by the two counters gives a measure of the frequency difference, while the absolute values of the counters gives a measure of the relative phase if they are otherwise free-running. The source of error in such a measurement is the uncertainty when synchronizing the enable signal from the source clock domain to the destination clock domain; a synchronizer has a delay uncertainty of one clock cycle which varies depending on the alignment of the synchronized signal transition with the capturing clock edge. This uncertainty can lead to a total measurement uncertainty of up to two increments of the counter; one cycle when synchronizing the rising edge of the enable signal and one cycle when synchronizing the falling edge. An arbitrarily accurate frequency offset measurement can therefore be performed by extending the duration of the measurement over more cycles.

Such a frequency measurement can be used to initialize, or update, the phase tracking. However, there is inevitably a residual error if only the frequency difference is tracked, and it could be necessary to ensure that the long-term number of samples received and consumed are matched. In some aspects, a closed-loop mechanism which tracks the total number of samples received and consumed and updates the frequency and sampling phase accordingly is therefore used. Hence, with reference again to FIG. 5, according to an embodiment the network node 200 is configured to perform step S110:

S110: The network node 200 updates the frequency difference and the phase difference using a closed-loop update procedure.

According to an embodiment the network node 200 is configured to update the frequency difference and the phase difference, and thus perform the closed-loop update procedure, by performing steps S110a-S110e:

S110a: The network node 200 obtains a reference signal with a known nominal period from the clock domain of the RAN.

S110b: The network node 200 receives the reference signal within the clock domain of the DAS.

S110c: The network node 200 maintains a phase accumulator and frequency control word in the clock domain of the DAS operable to provide a comparative reference phase.

S110d: The network node 200 compares the phase of the received reference signal to the comparative reference phase.

S110e: The network node 200 updates the frequency control word for the comparative reference phase to track the received reference signal phase.

Figure 7:
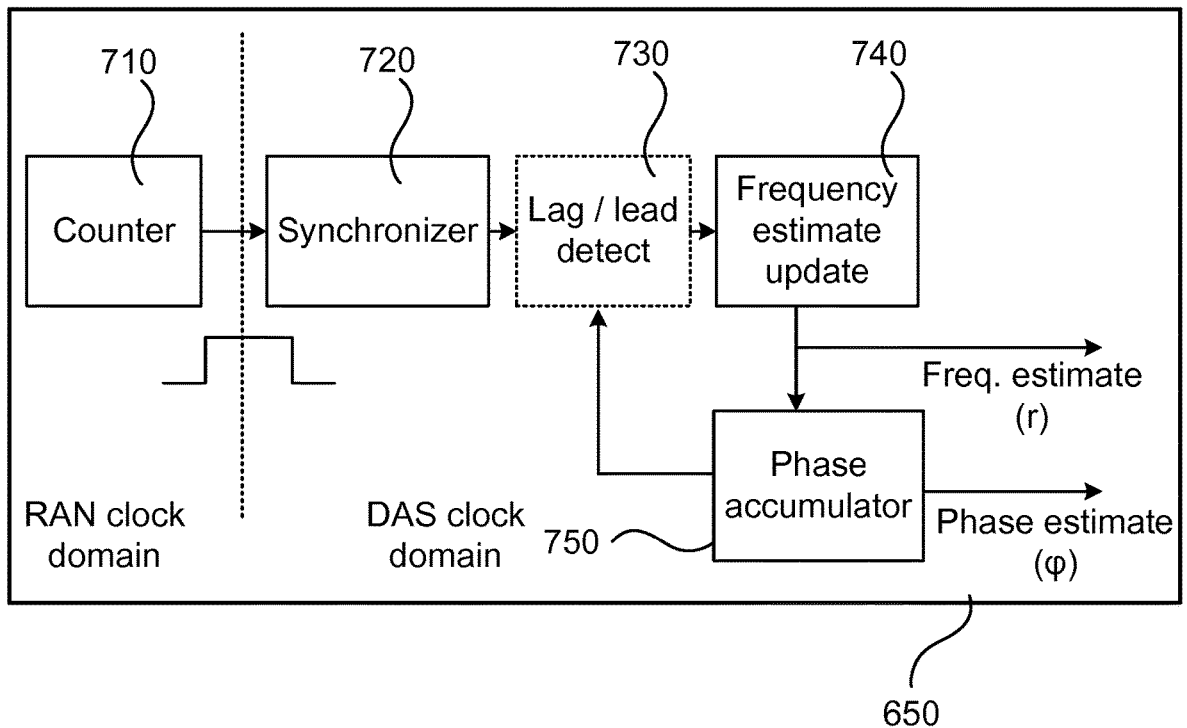
FIG. 7 is a block diagram of a sample rate offset/phase tracking function according to an embodiment.

Further aspects of the closed-loop update procedure will be disclosed next with reference to FIG. 7. FIG. 7 is a block scheme of a sample rate offset/phase tracking function 650 as in FIG. 6 that comprises a closed-loop mechanism. A counter 710 in the source clock domain (in FIG. 7 illustrated by the RAN clock domain) generates a pulse waveform with a known period. A phase accumulator function 750 in the destination clock domain (in FIG. 7 illustrated by the DAS clock domain) is incremented with a fractional value according to the frequency shift estimate update function 740. The phase accumulator determines at which point the expected transition in the pulse from the source clock domain should arrive. The timing pulse from the source clock domain is synchronized into the destination clock domain by a synchronizer function 720, and the timing of the transition is compared with that estimated from the phase accumulator. A lag/lead detect function 730 determines a lag or lead of the timing that is used to update the frequency estimate in the frequency shift estimate update function.

Although FIG. 7 illustrates a scenario where the difference in frequencies are measured on the DAS side of the clock domain crossing, it would be equally possible to measure and correct the difference in frequencies on the RAN side since the flow of digital signals is bidirectional. Hence, the placements of the RAN clock domain and the DAS clock domain in FIG. 7 could be reversed. Equally, steps S110a-S110e could also be readily adapted so as to measure and correct the difference in frequencies on the RAN side. Hence, with reference again to FIG. 5, according to an embodiment the network node 200 is configured to update the frequency difference and the phase difference, and thus perform the closed-loop update procedure, by performing steps S110a'-S110e' (instead of above steps S110a-S110e):

S110a': The network node 200 obtains a reference signal with a known nominal period from the clock domain of the DAS.

S110b': The network node 200 receives the reference signal within the clock domain of the RAN.

S110c': The network node 200 maintains a phase accumulator and frequency control word in the clock domain of the RAN operable to provide a comparative reference phase.

S110d': The network node 200 compares the phase of the received reference signal to the comparative reference phase;

S110e': The network node 200 updates the frequency control word for the comparative reference phase to track the received reference signal phase.

There are different ways to minimize the synchronization error input to the control loop. According to a first example the synchronization error input is minimized by increasing the measurement period over more clock cycles. According to a second example the synchronization error input is minimized by increasing the sampling rate at the synchronizer function, thereby enabling the source clock phase to be more finely distinguished. According to a third example the synchronization error input is minimized by operating the synchronizer function with a clock whose phase can be programmatically varied with a known fine step size, thereby enabling the source clock phase to be more finely distinguished.

The frequency offset estimate used for the frequency shift may either be taken from the frequency state variable within the closed loop process, or from independent frequency offset measurements.

Figure 8:
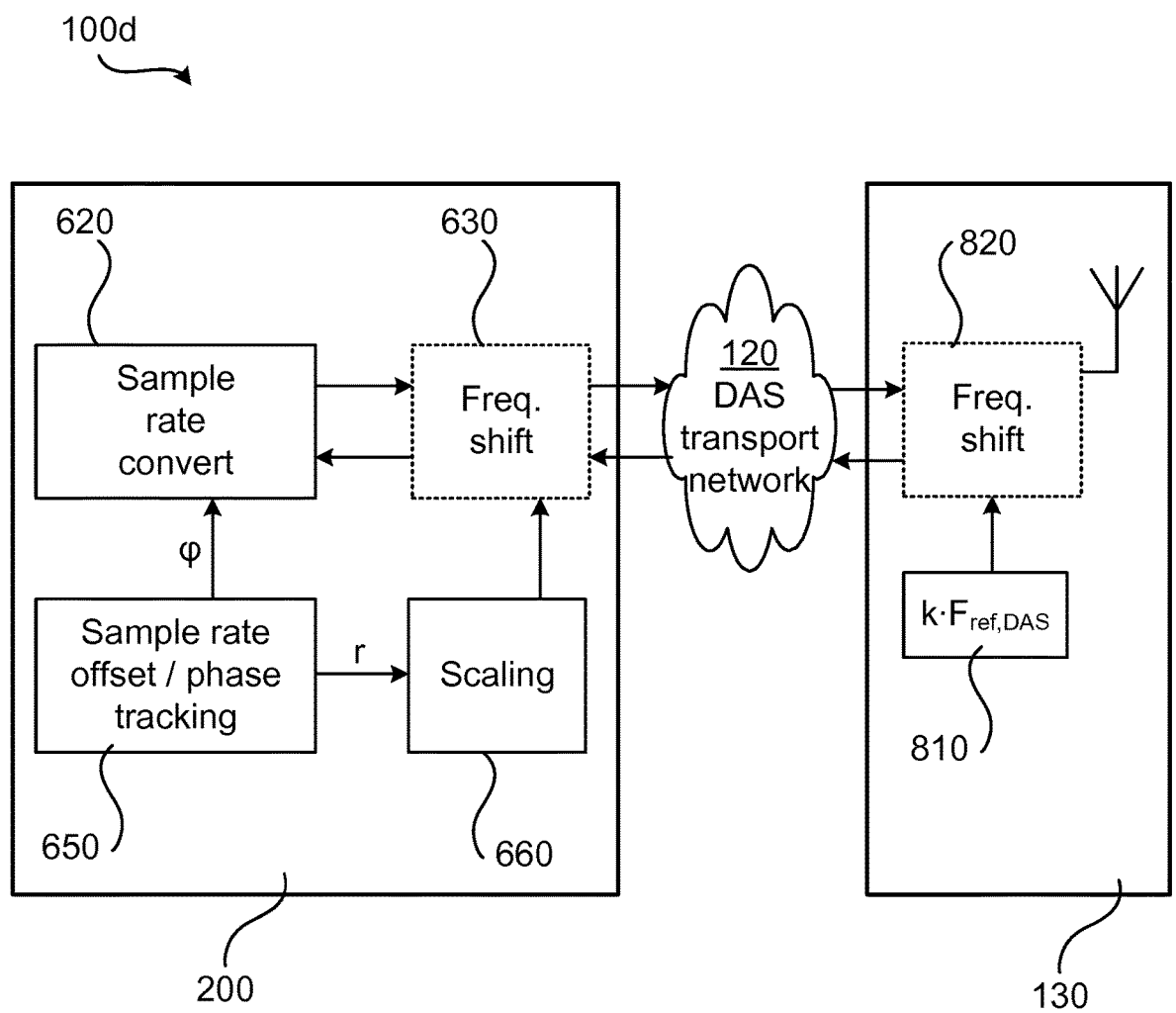
FIG. 8 is a block diagram of a communications network according to an embodiment.

The example in FIG. 8 shows the offset measurement being performed in the clock domain of the DAS. However, since the data transfer is inherently bidirectional, the control loop may be implemented in either clock domain.

The phase and frequency offsets from the perspective of one clock domain can be directly derived from the measurements in the other clock domain.

FIG. 8 is a block diagram of a part 100d of the multi-operator network 100c illustrating how the tracking of the relative clock domain phase and frequency can be used to control the sampling rate conversion and to correct for the frequency offset and how the MHU 200 interacts with the RHU 130. In this respect the RHU 130 comprises a frequency shift function 820 in case the MHU 200 does not comprise a frequency shift function 620, and vice versa. The RHU 130 further comprises a scaling function 810 configured to provide the frequency shift function 820 with a value $k \cdot F_{ref,DAS}$. As in FIG. 6, the sample rate offset/phase tracking function 650 generates control for resampling and frequency offset correction, the sample rate convert function 620 performs sample rate conversion, the scaling function 660 (first scaling function) and the frequency shift function 630 (first mixer) performs correction of frequency offset, and the frequency shift function 820 (second mixer) and the scaling function 810 (second scaling function) performs conversion of the digital signal to the output radio frequency. The conversion of the digital signal to the output radio frequency is a fixed frequency shift common for all network operators, and is not able to consider, or take into account, any per-network operator frequency correction. In more detail, the phase offset is used to control the sample rate conversion function. The radio signal frequency generated at the RHU is proportional to the DAS reference frequency, while the wanted radio signal frequency is proportional to the RAN clock domain reference frequency. There is therefore a frequency error introduced at the RHU for the operator signal which is proportional to the relative frequency difference between the DAS and RAN. The measured frequency error is scaled to generate an NCO control word so as to shift the digital signal in frequency to compensate for the error, leading to a signal from the RHU which is substantially equal to the wanted radio signal frequency proportional to the RAN clock domain reference.

Figure 9:
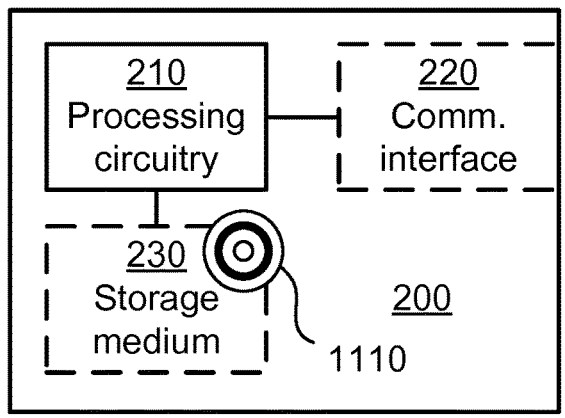
FIG. 9 is a schematic diagram showing functional units of a network node according to an embodiment.

FIG. 9 schematically illustrates, in terms of a number of functional units, the components of a network node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1110 (as in FIG. 11), e.g. in the form of a storage medium 230. The processing circuitry 210 may further be provided as at least one application specific integrated circuit (ASIC), or field programmable gate array (FPGA).

Particularly, the processing circuitry 210 is configured to cause the network node 200 to perform a set of operations, or steps, S102-S110, as disclosed above. For example, the storage medium 230 may store the set of operations, and the processing circuitry 210 may be configured to retrieve the set of operations from the storage medium 230 to cause the network node 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The network node 200 may further comprise a communications interface 220 at least configured for communications with other entities, nodes, and devices of the multi-operator network 100c. As such the communications interface 220 may comprise one or more transmitters and receivers, comprising analogue and digital components. The processing circuitry 210 controls the general operation of the network node 200 e.g. by sending data and control signals to the communications interface 220 and the storage medium 230, by receiving data and reports from the communications interface 220, and by retrieving data and instructions from the storage medium 230. Other components, as well as the related functionality, of the network node 200 are omitted in order not to obscure the concepts presented herein.

Figure 10:
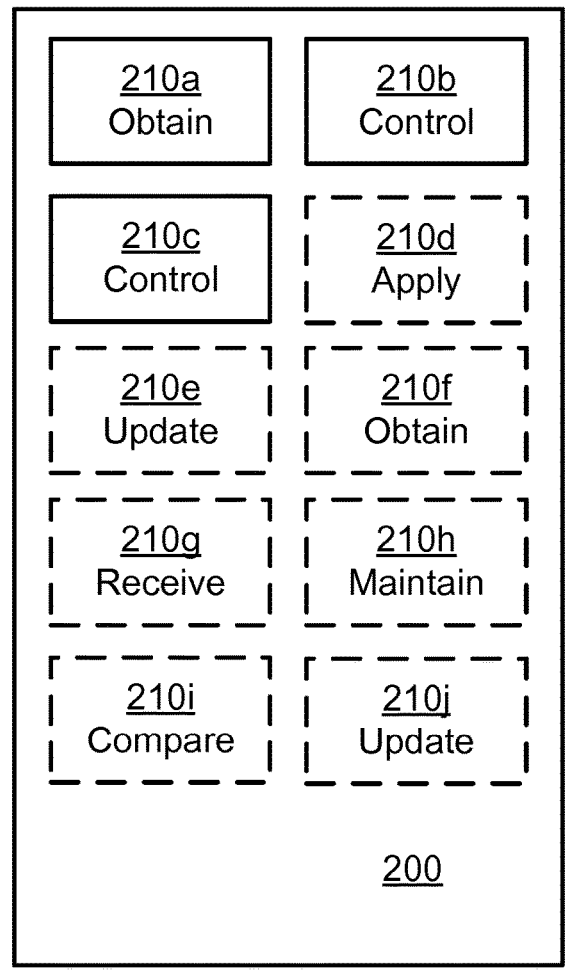
FIG. 10 is a schematic diagram showing functional modules of a network node according to an embodiment.

FIG. 10 schematically illustrates, in terms of a number of functional modules, the components of a network node 200 according to an embodiment. The network node 200 of FIG. 10 comprises a number of functional modules; an obtain module 210a configured to perform step S102, a control module 210b configured to perform step S104, and a control module 210C configured to perform step S106. The network node 200 of FIG. 10 may further comprise a number of optional functional modules, such as any of an apply module 210d configured to perform step S108, an update module 210e configured to perform step S110, an obtain module 210f configured to perform step S110a and/or S110a', a receive module 210g configured to perform step S110b and/or S110b', a maintain module 210h configured to perform step S110c and/or S110c', a compare module 210i configured to perform step S110d and/or S110d', and an update module 210j configured to perform step S110e and/or S110e'.

In general terms, each functional module 210a-210j may in one embodiment be implemented only in hardware and in another embodiment with the help of software, i.e., the latter embodiment having computer program instructions stored on the storage medium 230 which when run on the processing circuitry makes the network node 200 perform the corresponding steps mentioned above in conjunction with FIG. 10. It should also be mentioned that even though the modules correspond to parts of a computer program, they do not need to be separate modules therein, but the way in which they are implemented in software is dependent on the programming language used. Preferably, one or more or all functional modules 210a-210j may be implemented by the processing circuitry 210, possibly in cooperation with the communications interface 220 and/or the storage medium 230. The processing circuitry 210 may thus be configured to from the storage medium 230 fetch instructions as provided by a functional module 210a-210j and to execute these instructions, thereby performing any steps as disclosed herein.

The network node 200 may be provided as a standalone device or as a part of at least one further device. For example, the network node 200 may be provided in a DMU. Alternatively, functionality of the network node 200 may be distributed between at least two devices, or nodes. These at least two nodes, or devices, may either be part of the same network part (such as the RAN or the DAS) or may be spread between at least two such network parts.

Thus, a first portion of the instructions performed by the network node 200 may be executed in a first device, and a second portion of the of the instructions performed by the network node 200 may be executed in a second device; the herein disclosed embodiments are not limited to any particular number of devices on which the instructions performed by the network node 200 may be executed. Hence, the methods according to the herein disclosed embodiments are suitable to be performed by a network node 200 residing in a cloud computational environment. Therefore, although a single processing circuitry 210 is illustrated in FIG. 9 the processing circuitry 210 may be distributed among a plurality of devices, or nodes. The same applies to the functional modules 210a-210j of FIG. 10 and the computer program 1120 of FIG. 11 (see below).

Figure 11:
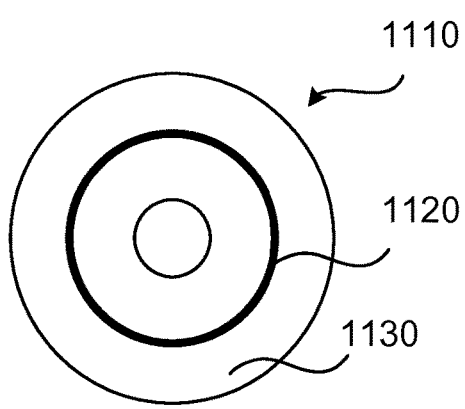
FIG. 11 shows one example of a computer program product comprising computer readable storage medium according to an embodiment.

FIG. 11 shows one example of a computer program product 1110 comprising computer readable storage medium 1130. On this computer readable storage medium 1130, a computer program 1120 can be stored, which computer program 1120 can cause the processing circuitry 210 and thereto operatively coupled entities and devices, such as the communications interface 220 and the storage medium 230, to execute methods according to embodiments described herein. The computer program 1120 and/or computer program product 1110 may thus provide means for performing any steps as herein disclosed.

In the example of FIG. 11, the computer program product 1110 is illustrated as an optical disc, such as a CD (compact disc) or a DVD (digital versatile disc) or a Blu-Ray disc. The computer program product 1110 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1120 is here schematically shown as a track on the depicted optical disk, the computer program 1120 can be stored in any way which is suitable for the computer program product 1110.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for controlling sample rate and frequency shift of a digital signal in a multi-operator network, the method being performed by a network node, the method comprising:
   obtaining a frequency difference and a phase difference between two clock domains, wherein one of the clock domains is the clock domain of a radio access network of a network operator of the multi-operator network and the other of the clock domains is the clock domain of a distributed antenna system in the multi-operator network;
   controlling sample rate conversion of the digital signal between the two clock domains using the phase difference, wherein the digital signal is communicated between the radio access network and the distributed antenna system; and
   controlling a frequency shift of the digital signal using the frequency difference.

2. The method according to claim 1, wherein the frequency difference defines a difference in reference frequencies, the method further comprising:
   applying the frequency shift to the digital signal so as to compensate the digital signal for a radio frequency difference caused by the difference in reference frequencies.

3. The method according to claim 1, wherein the frequency shift is proportional to a frequency ratio between a reference frequency of the clock domain of the radio access network and a reference frequency of the clock domain of the distributed antenna system.

4. The method according to claim 1, wherein the frequency difference is obtained from a difference in update rate between a counter in the clock domain of the radio access network and a counter in the clock domain of the distributed antenna system, and the phase difference is obtained from an absolute value difference between the counter in the clock domain of the radio access network and the counter in the clock domain.

5. The method according to claim 1, wherein the clock domain of the distributed antenna system is based on its own internal frequency reference.

6. The method according to claim 1, wherein the clock domain of the distributed antenna system is based on a frequency reference of one of the network operators of the multi-operator network.

7. The method according to claim 6, wherein the digital signal has a bit rate, and wherein the frequency reference is recovered from the digital signal bit rate in the digital signal as received from a base station of one of the network operator's base stations.

8. The method according to claim 6, wherein the frequency reference is fed to the distributed antenna system as a separate clock signal.

9. The method according to claim 1, further comprising:
updating the frequency difference and the phase difference using a closed-loop update procedure.

10. The method according to claim 9, wherein updating the frequency difference and the phase difference further comprises:
obtaining a reference signal with a known nominal period from the clock domain of the radio access network;
receiving the reference signal within the clock domain of the distributed antenna system;
maintaining a phase accumulator and frequency control word in the clock domain of the distributed antenna system operable to provide a comparative reference phase;
comparing the phase of the received reference signal to the comparative reference phase; and
updating the frequency control word so that the comparative reference phase tracks the received reference signal phase.

11. The method according to claim 9, wherein updating the frequency difference and the phase difference further comprises:
obtaining a reference signal with a known nominal period from the clock domain of the distributed antenna system;
receiving the reference signal within the clock domain of the radio access network;
maintaining a phase accumulator and frequency control word in the clock domain of the radio access network operable to provide a comparative reference phase;
comparing the phase of the received reference signal to the comparative reference phase; and
updating the frequency control word so that the comparative reference phase tracks the received reference signal phase.

12. A network node for controlling sample rate and frequency shift of a digital signal in a multi-operator network, the network node comprising processing circuitry, the processing circuitry being configured to cause the network node to:
obtain a frequency difference and a phase difference between two clock domains, wherein one of the clock domains is the clock domain of a radio access network of a network operator of the multi-operator network and the other of the clock domains is the clock domain of a distributed antenna system in the multi-operator network;
control sample rate conversion of the digital signal between the two clock domains using the phase difference, wherein the digital signal is communicated between the radio access network and the distributed antenna system; and
control a frequency shift of the digital signal using the frequency difference.

13. A computer program for controlling sample rate and frequency shift of a digital signal in a multi-operator network, the computer program being stored on a non-transitory computer readable storage medium and comprising computer code which, when run on processing circuitry of a network node, causes the network node to:
obtain a frequency difference and a phase difference between two clock domains, wherein one of the clock domains is the clock domain of a radio access network of a network operator of the multi-operator network and the other of the clock domains is the clock domain of a distributed antenna system in the multi-operator network;
control sample rate conversion of the digital signal between the two clock domains using the phase difference, wherein the digital signal is communicated between the radio access network and the distributed antenna system; and
control a frequency shift of the digital signal using the frequency difference.

* * * * *